(12) United States Patent
Morton

(10) Patent No.: US 6,480,484 B2
(45) Date of Patent: *Nov. 12, 2002

(54) INTERNET-INTRANET GREETING SERVICE

(75) Inventor: Michael D. Morton, Howell, NJ (US)

(73) Assignee: Avaya Technology Corp., Basking Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,316

(22) Filed: Jun. 9, 1998

(65) Prior Publication Data

US 2002/0126679 A1 Sep. 12, 2002

(51) Int. Cl.[7] ............... H04L 12/66; H04M 3/42; H04M 3/487; H04M 3/50; H04M 3/527

(52) U.S. Cl. ............... 370/352; 379/52; 379/201; 379/210; 379/900; 709/218

(58) Field of Search ............... 370/352; 379/67.1, 379/88.23, 88.25, 90.01, 52, 155, 201, 900, 210; 709/206, 217, 225, 218, 219, 227, 250

(56) References Cited

U.S. PATENT DOCUMENTS 5,799,063 A * 8/1998 Krane ............... 379/67
5,828,839 A * 10/1998 Moncreiff ............... 395/200.34
5,850,433 A * 12/1998 Rondeau ............... 379/201

(List continued on next page.)

OTHER PUBLICATIONS

Definity® Enterprise Communications Server, Release 6, Administration and Feature Description, 555–230–522, Issue 4, May 1998, Lucent Technologies Inc., pp. 4–146 to 4–166 and 4–224 to 4–231.

VocalTec Internet Phone Release 5, Overview and Features, and VocalTec Telephony Gateway, Surf & Call Introduction, http://www.vocaltec.com/products, 10 pp., May 1998.

VocalTec Internet Phone Release 5, User Manual, pp. 17–24 and 40, 1998.

(List continued on next page.)

*Primary Examiner*—Hassan Kizou
*Assistant Examiner*—Joe Logsdon
(74) *Attorney, Agent, or Firm*—Ryan, Mason & Lewis, LLP

(57) ABSTRACT

An Internet/intranet-based arrangement for automatically retrieving and presenting a greeting web page in response to a caller placing a call to a called party. This greeting service provides the caller with information relating to the called party and gives the caller various options for contacting the called party, redirecting the call or obtaining additional information. In an illustrative embodiment, a greeting application program running on a caller terminal obtains an identifier, such as a URL, of the greeting web page associated with the called party. This identifier is provided to a web browser application program running on the caller terminal, which uses it to retrieve the greeting web page and display it to the viewer during the call. The invention is applicable to both telephone calls and IP calls. Some of the actions which may be taken by the caller from the displayed greeting web page include selecting an alternate destination for the call, selecting a covering party for the call, paging the called party, leaving a message for the called party, conducting a textual chat with the called party, receiving call progress information, receiving private information intended only for the caller, and retrieving related documents.

20 Claims, 5 Drawing Sheets

U.S. PATENT DOCUMENTS

| | | | | |
|---|---|---|---|---|
| 5,854,897 A | * | 12/1998 | Radziewicz et al. | 395/200.54 |
| 5,907,547 A | * | 5/1999 | Foladare et al. | 370/352 |
| 5,907,681 A | * | 5/1999 | Bates et al. | 395/200.58 |
| 5,974,449 A | * | 10/1999 | Chang et al. | 709/206 |
| 5,978,806 A | * | 11/1999 | Lund | 707/10 |
| 6,002,749 A | * | 12/1999 | Hansen et al. | 379/52 |
| 6,031,836 A | * | 2/2000 | Haserodt | 370/389 |
| 6,052,715 A | * | 4/2000 | Fukui et al. | 709/217 |
| 6,061,716 A | * | 5/2000 | Moncreiff | 709/204 |
| 6,078,650 A | * | 6/2000 | Hansen | 379/52 |
| 6,097,793 A | * | 8/2000 | Jandel | 379/93.23 |
| 6,108,406 A | * | 8/2000 | Mitchell et al. | 379/93.25 |
| 6,118,860 A | * | 9/2000 | Hillson et al. | 379/155 |
| 6,138,158 A | * | 10/2000 | Boyle et al. | 709/225 |
| 6,141,413 A | * | 10/2000 | Waldner et al. | 379/265 |
| 6,295,551 B1 | * | 9/2001 | Roberts et al. | 709/205 |

OTHER PUBLICATIONS

NetSpeak WebPhone® User's Guide, Version 4.0, pp. 39–62, Apr. 22, 1998.

NetSpeak WebPhone® 4.0 Software Introduction, Product Benefits, System Requirements, Installation Instructions, Comparison Chart and Client Software Products, http://www.connect.netspeak.com/product, 10 pp., May 1998.

Artisoft TeleVantage™ "The Intelligent Phone System," Product Literature, 6 pp., Artisoft, Inc., Cambridge, MA, 1998.

FastCall® Product Literature, 7 pp., Spanlink Communications, http://www.spanlink.com/products, May 1998.

PhoneMax Version 2.0 Product Literature, 5 pp., Active Voice, http://www.activevoice.com/pr_Phonemax.html, May 1998.

ViewCall Product Literture, 11 pp., Active Voice, http://www.activevoice.com/pr_viewcall.html, May 1998.

Phonetastic Network Edition, "An Affordable Call Management System for Workgroups on a Network," 4 pp., http://www.callware.com/product/pt/pt–net.html, May 1998.

* cited by examiner

INTERNET-INTRANET GREETING SERVICE

FIELD OF THE INVENTION

This invention relates generally to web browsers, Internet Telephony and Computer Telephony Integration (CTI), and more particularly to techniques for processing calls using these anrd other similar technologies.

BACKGROUND OF THE INVENTION

Telephone switching systems such as Private Branch Exchanges (PBXs) and key systems have long provided the ability to redirect calls when the called party is busy or does not answer the call. This is accomplished with features known as call forwarding or call coverage, which allow calls to be redirected under busy or no answer conditions to alternate telephony endpoints. These endpoints may include an alternate telephone for the called party, e.g., a telephone at a home location, or a telephone for a covering person such as an operator or secretary. Calls may also be redirected to a voice messaging system where the caller can leave a message for the called party. In this case, the caller can typically listen to a greeting which has been recorded by the called party. The greeting is used to supply information that the called party wishes to convey to callers, such as a schedule or alternate telephone numbers. Conventional greetings in this context are generally limited to recorded voice announcements. Actions that the caller can take while listening to the greeting are limited to those that can be easily achieved using a touch tone user interface based on the telephone keypad.

Increasingly, communication applications are making use of Internet technologies and standards. Web browser and server applications, for example, provide a widespread infrastructure for delivering multimedia content. Also, for example, applications are beginning to make use of the Internet for voice calls. As the popularity of the Internet grows, it becomes increasingly desirable to use Internet technologies and related applications to enhance the call redirection and greeting services that are made available to users.

Unfortunately, existing call processing techniques generally do not take advantage of the full capabilities provided by Internet technologies. For example, although conventional personal web pages can provide important and useful information about a called party, such as alternate telephone numbers, a weekly schedule, a photograph, and so on, such pages are generally not automatically retrieved and displayed to a caller in response to a call attempt. Conventional CTI applications such as "screen pop" applications in call centers focus on presenting information about the calling party to the person receiving the call. These implementations do not benefit a caller who, under circumstances where the called party is not available, needs more options and information on how to reach the called party. In addition, the above-noted call forwarding and call coverage features in conventional telephone systems redirect calls to predefined destinations, and typically do not allow the caller to choose where to direct the call. Moreover, conventional IP telephony applications typically do not provide call coverage or call forwarding features nor do they provide an acceptable greeting service.

SUMMARY OF THE INVENTION

The invention provides methods and apparatus for automatically retrieving and displaying a greeting web page in response to a caller placing a call to a called party. The web page can be automatically retrieved over a communication network, such as the Internet or an intranet, upon initiation of the call. The web page presents information related to the called party and gives the caller options for contacting the called party, redirecting the call or obtaining additional information. These options may include, for example, redirecting the call to an alternate destination, redirecting the call to a covering person, and paging the called party. The invention improves the ability of the calling party to reach the called party or to obtain useful information about the called party. The invention thereby provides substantial advantages over a conventional recorded voice greeting and a touch tone user interface, or a personal web page which is not automatically accessed in response to a call attempt. The invention can also be applied to Internet Protocol (IP) telephony calls in which a call is placed over an IP data network or other type of network.

In an illustrative embodiment of the invention, a greeting service is implemented in a communication system that includes a calling party terminal and telephone, other user terminals and telephones, a telephone system, and an application server, with the telephone system, terminals and application server interconnected by an Internet/intranet. A calling party initiates a call to a called party by, for example, manually dialing a telephone number at the calling party telephone, or entering appropriate information at the calling party terminal. The identity of the called party is available to the calling party terminal, for example, because the call was initiated by the calling party terminal or because the telephone system sends this information to the calling party terminal via the Internet/intranet.

After the call is initiated, a request for the location of the called party greeting data is sent from the calling party terminal to the application server. In response to receipt of the request at the application server, the location of the called party greeting data is sent from the application server to the calling party terminal. A request for the greeting data associated with the called party is then sent from the calling party terminal to the application server. In response to receipt of the request at the application server, the greeting data associated with the called party is sent from the application server to the calling party terminal, and presented to the calling party during the call in the form of a greeting web page. As the state of the call changes, various types of call progress information may be sent to the calling party terminal from the telephone system or the called party terminal, and displayed in the greeting web page. The calling party can provide data and select actions to be taken These actions include, for example, initiating a new call to attempt to reach the called party at an alternate destination, initiating a new call to a covering person associated with the called party, such as a secretary or operator, paging the called party with numeric or alphanumeric messages, retrieving private information that is intended only for the calling party, and retrieving documents relating to the called party.

A greeting service implemented in accordance with the invention gives the calling party substantially more information and more control over their calls than is possible in conventional systems. Moreover, the greeting service can be implemented using existing standards. For example, the request for the location of the called party greeting data may be sent over the Internet/intranet using the Lightweight Directory Access Protocol (LDAP), and the greeting data may be sent via the Internet/intranet using the Hypertext Transfer Protocol (HTTP). Furthermore, the greeting data sent to the calling party terminal may be in a form supported by a Hypertext Mark-up Language (HTML) page or Java screen, such that the calling party can use entry fields on the form to provide data and use HTML links or buttons to invoke actions. By using these standard and widely available communication mechanisms, the greeting service can be made instantly and widely accessible without change to the existing Internet/intranet infrastructure. These and other features and advantages of the present invention will become more apparent from the following detailed description considered together with the accompanying drawings.

DETAILED DESCRIPTION OF THE INVENTION

The invention will be illustrated below in conjunction with an exemplary greeting service implemented in a communications system. Although particularly well-suited for obtaining greeting data over the Internet using Transmission Control Protocol/Internet Protocol (TCP/IP) connections, the invention is not limited to use with any particular type of network or network communication protocol. The term "Internet/intranet" as used herein should be understood to include the Internet, an intranet, an extranet, a local area network, a wide area network, as well as combinations of these and other types of networks. An "IP call" as the term is used herein is intended to include calls placed over any Internet/intranet. The term "web page" should be understood to include any type of graphical information which is retrieved and displayed to a caller and which provides information about a called party, or allows a calling party to invoke functions relating to the called party. A given "web page" as the term is used herein may include multiple separate pages, windows, or other groupings of displayed information. For example, a portion of a given web page may be accessible via a link or other connection from another portion of that web page.

Figure 1:
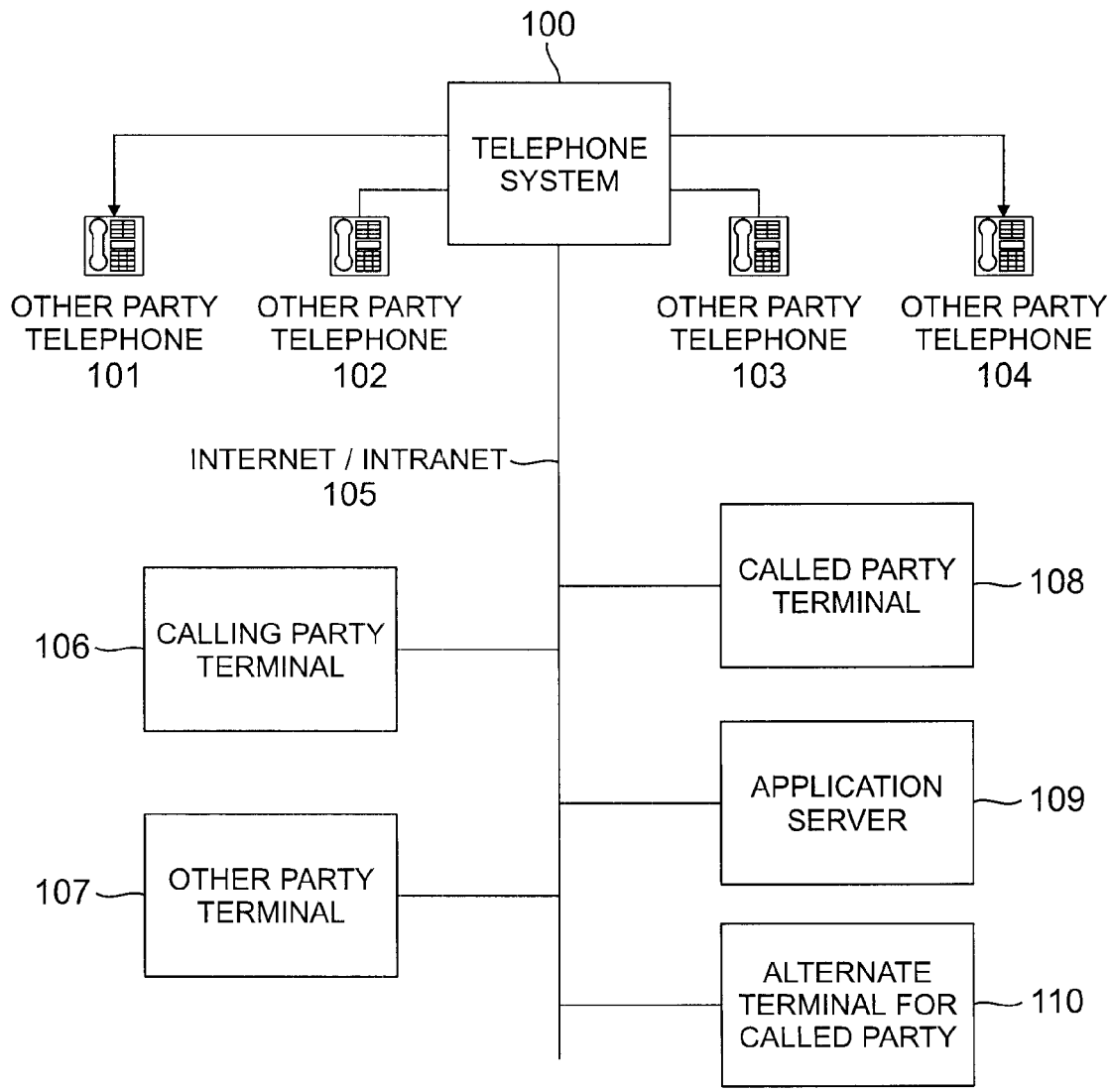
FIG. 1 is a block diagram of a communications system which implements an illustrative embodiment of the invention.
Figure 2:
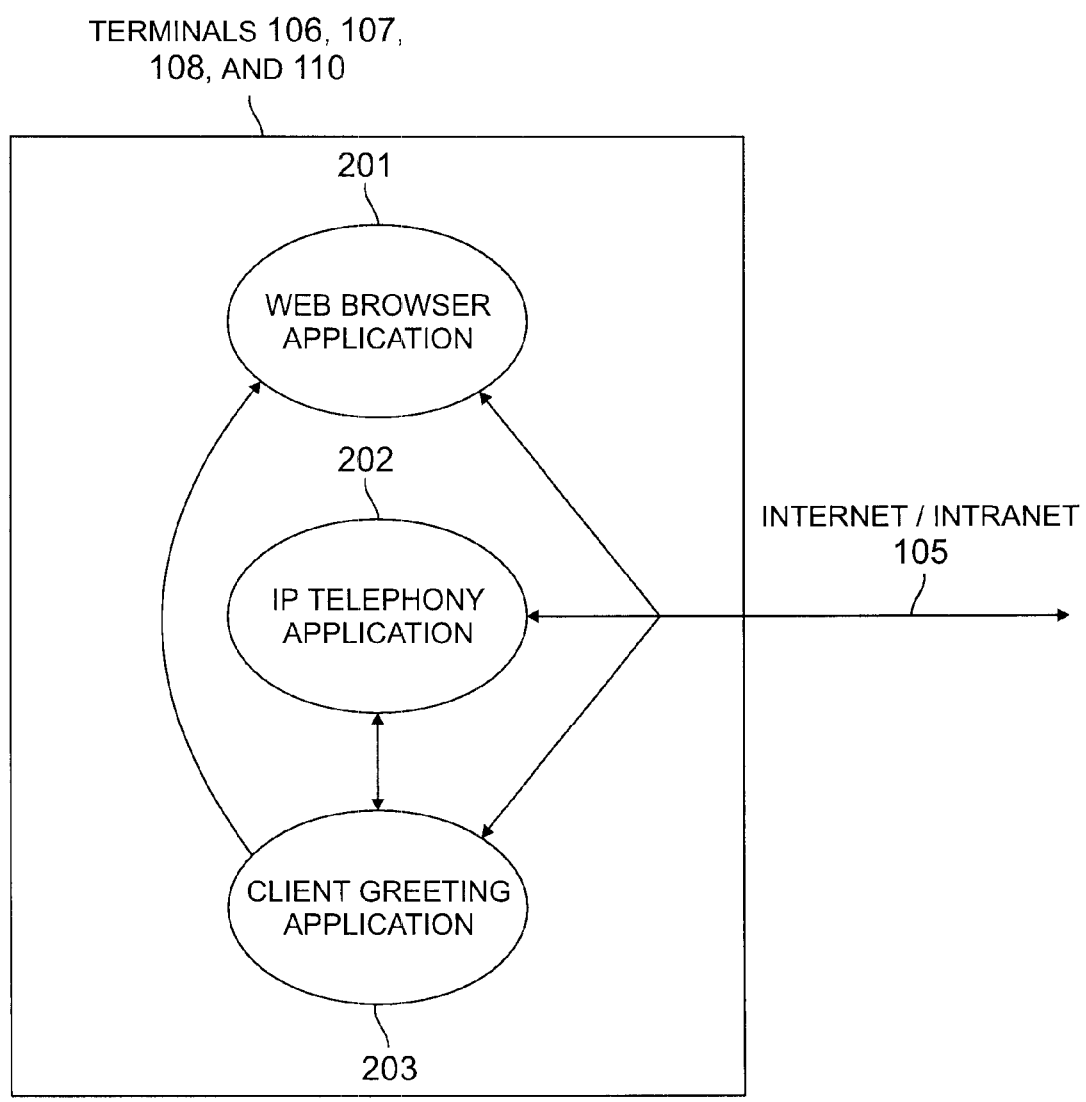
FIG. 2 is a block diagram of an illustrative implementation of the user terminals in the communications system of FIG. 1.

FIG. 1 shows a communications system which embodies an illustrative implementation of the invention. The communication system includes a telephone system 100, such as the Lucent DEFINITY® PBX or Lucent LEGEND® PBX/key system, which is connected by voice ports to telephones 101, 102, 103, and 104. Telephone system 100 is also connected to an Internet/intranet 105, which as previously noted may be any type of network. Connected to Internet/intranet 105 are user terminals 106, 107, 108, and 110, each of which may be, for example, a personal computer equipped with a web browser application 201 as shown in FIG. 2, such as a Netscape Navigator™ or a Microsoft Internet Explorer™. Also connected to Internet/intranet 105 is at least one application server 109.

A calling party using telephone 102 or terminal 106 places calls to other parties, such as a called party using telephone 103. Calls placed using telephone 102 are dialed using the telephone keypad, while calls placed using the terminal 106 are placed using a CTI connection over Internet/intranet 105 to telephone system 100. In either case, the calls are transported by telephone system 100. Telephone system 100 may redirect such calls to other parties, such as the party at telephone 101, when the called party at telephone 103 is busy on an existing call or is not available to answer the call. Such calls may also be redirected to a voice messaging system (not shown), so that the calling party may listen to a voice greeting supplied by the called party and/or leave a message for the called party. In addition, the called party may have their calls forwarded by telephone system 100 to an alternate telephone such as telephone 104. In a typical conventional system, redirection of the call is controlled by telephone system 100 and the calling party does not receive greeting information on terminal 106 about the called party.

The calling party using terminal 106 can also place calls to other parties, such as a called party at terminal 108, using an IP telephony application 202 as shown in FIG. 2. Exemplary IP telephony applications include Microsoft Net meeting™ or a VocalTec™ Internet Phone. Calls initiated in this manner using the IP telephony application program 202 are transported by Internet/intranet 105. In a typical conventional system, no call redirection is provided and the calling party terminal 106 does not display greeting information about the called party.

In accordance with the invention, the calling party terminal 106 interacts with application server 109 over Internet/intranet 105 to provide a Internet/intranet-based greeting service which will be described in greater detail below.

FIG. 2 shows the terminals 106, 107, 108 and 110 in greater detail. The terminals 106, 107, 108 and 110 in the illustrative embodiment are each equipped with the web browser application 201, the IP telephony application 202, and a client greeting application 203. The client greeting application 203 receives call initiation and call progress information from either the IP telephony application 202 or the telephone system 100. Client greeting application 203 is notified when calls are initiated and subsequently controls the presentation of greeting data using web browser application 201. Under different calling scenarios, terminals 106, 107, 108, and 110 may change roles depending upon which user initiates the call. For example, the user of terminal 108 becomes the calling party when that user initiates a call. Similarly, the user of terminal 106 becomes the called party when calls are placed to that user. The operation of these and other scenarios will be apparent to those skilled in the art and are therefore not further described herein.

Figure 3:
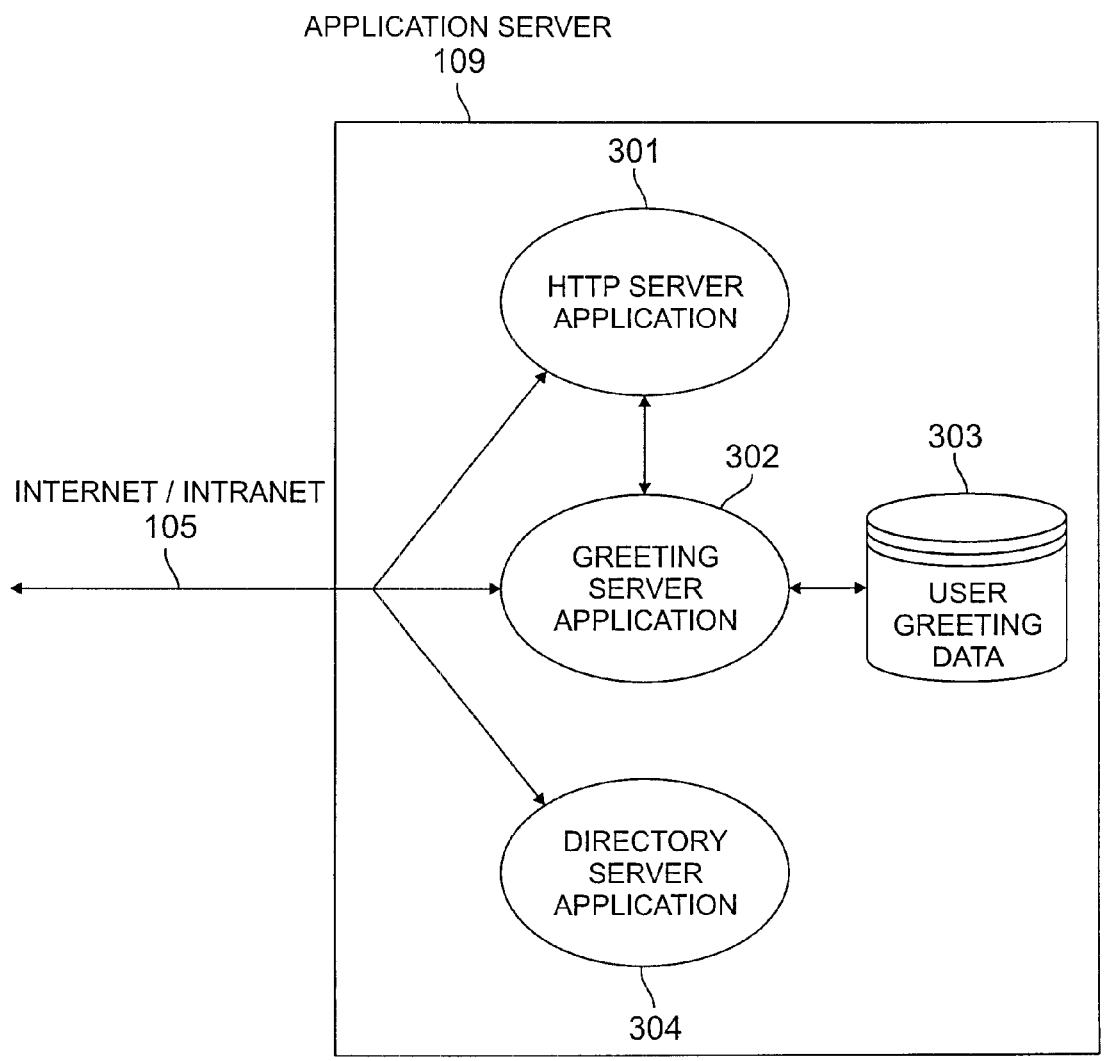
FIG. 3 is a block diagram of an illustrative implementation of the application server in the communications system of FIG. 1.

FIG. 3 shows the application server 109 in greater detail. Application server 109 in this embodiment is equipped with a Hypertext Transfer Protocol (HTTP) server application 301 such as a Netscape Fasttrack™ Server or a Microsoft Internet Information Server. HTTP server application 301 responds to requests for greeting information from Web browser application 201. Application server 109 is also equipped with a directory server application 304 which responds to requests from client greeting application 203 for the location of the greeting information. Directory server application 304 returns other data associated with the user identified in the request sent by client greeting application 203. Application server 109 is further equipped with a greeting server application 302 which interfaces with HTTP server application 301 and user greeting data 303. User greeting data 303 contains records of data associated with each user. The data records may include each user's ID, name, telephone number, IP address, alternate telephone numbers, alternate IP addresses, names and telephone numbers of alternate contacts such as an operator, superior or secretary, IP addresses of alternate contacts such as an operator, superior or secretary, personal calendars, numeric and/or alphanumeric pager information, personal photographs, etc.

Figure 4:
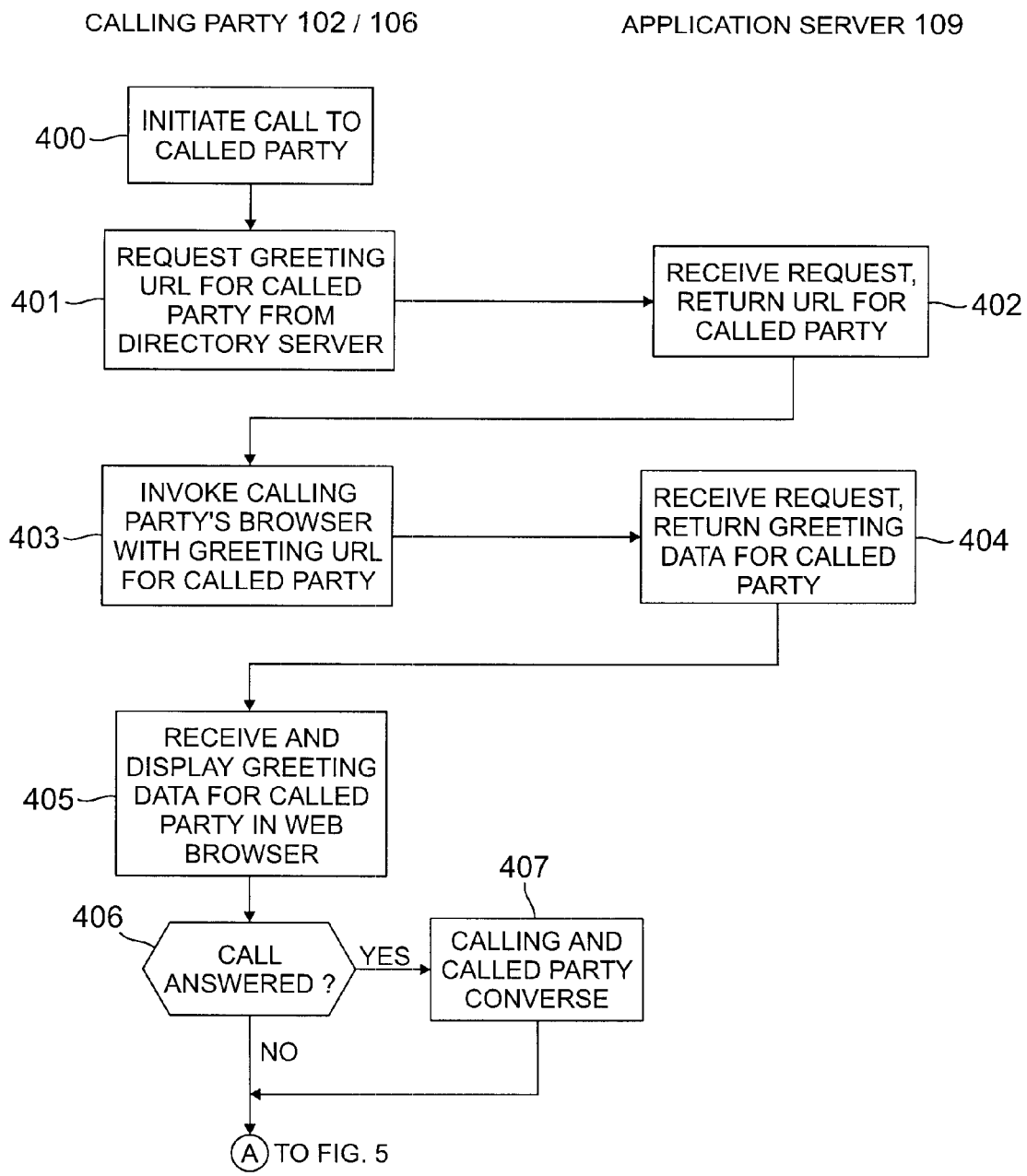
FIGS. 4 and 5 are a flow diagram of functions performed by the elements of the communications system of FIG. 1 to implement an Internet/intranet-based greeting service in accordance with the invention.
Figure 5:
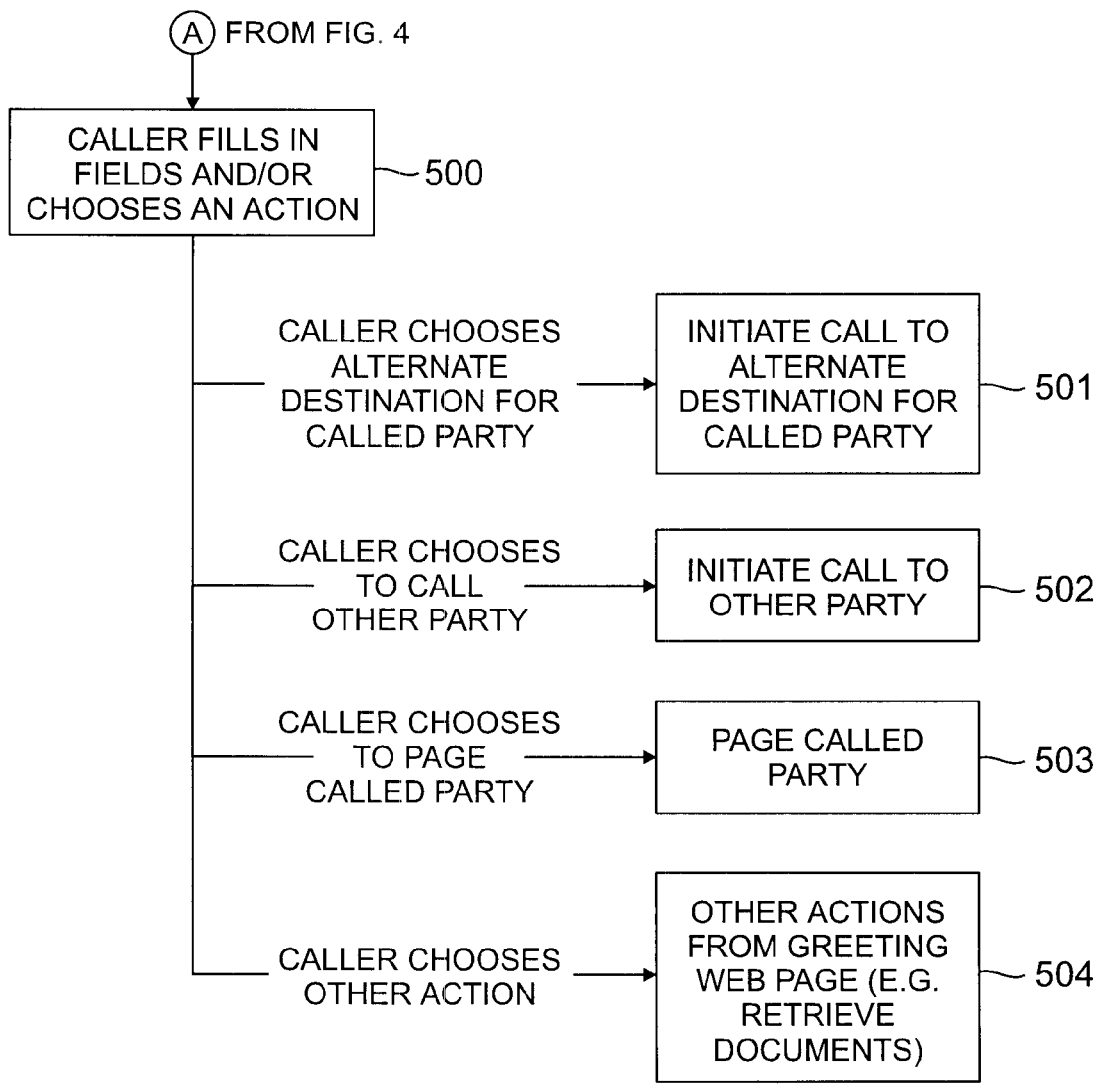

FIGS. 4 and 5 show exemplary functions performed by the elements of FIGS. 1 through 3 to provide an Internet/intranet-based greeting service in accordance with the invention. At step 400, the calling party at telephone 102 and terminal 106 initiates a call to the called party at telephone 103 and terminal 108. The call may be transported by either Internet/intranet 105 or telephone system 100. If transported by Internet/intranet 105, the call is initiated using IP telephony application 202 of terminal 106 and the IP address of the called party at terminal 108 is passed to client greeting application 203. If transported by telephone system 100, the call is initiated using the keypad on telephone 102 or by using a CTI dialing application (not shown) on terminal 106. In this case, the telephone number of the called party at telephone 103 is passed to client greeting application 203 of terminal 106. The telephone number is passed to client greeting application 203 either directly from a CTI dialing application (not shown) on terminal 106 or is passed over Internet/intranet 105 from telephone system 100.

The identifier for the called party derived in step 400 is used in step 401 to determine the URL for the greeting data associated with the called party at terminal 108 and telephone 103. Client greeting application 203 of terminal 106 sends the IP address or telephone number of the called party to directory server application 304 on application server 109 via Internet/intranet 105 in the form of a Lightweight Directory Access Protocol (LDAP) query. In response to this request, directory server application 304 looks up the URL associated with the called party's greeting data. This URL is returned to client greeting application 203 of terminal 106 via Internet/intranet 105 in the form of an LDAP response.

The returned URL is used at step 403 by client greeting application 203 to invoke the calling party's Web browser 201. Invoking Web browser 201 with a URL in this manner causes an HTTP request for the information referenced by the URL to be sent over Internet/intranet 105 to HTTP server application 301 on application server 109. This request is received by HTTP server application 301 at step 404. The requested URL is in a form that allows HTTP server application 301 to invoke processing of a Common Gateway Interface (CGI) script. Greeting server application 302 serves as such a CGI script for URLs referencing greeting data. Greeting server application 302 retrieves the user greeting data 303 associated with the requested URL. Greeting server application 302 then formats the user greeting data into a format which is suitable for display by web browser application 201, such as a general Hypertext Markup Language (HTML) page or an HTML page which references a downloadable Java applet.

The appropriately formatted data is then sent via Internet/intranet 105 to web browser application 201. At step 405, in response to the received data, web browser application 201 displays the received data for the called party at terminal 106. The calling party at terminal 106 may now view the greeting data associated with the called party and take actions, to be described in conjunction with FIG. 5 below, or wait for the call to proceed. If the call is answered at step 406, the calling and called parties may converse as shown in step 407.

Referring now to FIG. 5, at step 500 the calling party at terminal 106 may fill in fields and/or choose actions available in conjunction with the greeting data displayed in web browser application 201. Examples of possible actions the calling party may take are shown in steps 501 through 504. The calling party may take these actions whether or not the call is answered.

At step 501, the calling party at terminal 106 chooses to initiate a call to an alternate destination for the called party. The alternate destination may be selected from a list presented with the greeting information displayed by web browser application 201. For calls transported by telephone system 100, the alternate destinations may include an alternate destination on the same phone system, such as telephone 104, or destinations in the Public Switched Telephone Network (PSTN) including home and cellular phones. These types of calls may be implemented using conventional CTI capabilities of telephone system 100. In response to the calling party selection, greeting server application 302 sends a request for a call to be established between the calling party telephone 102 and the telephone number for the selected alternate destination. The request is sent over Internet/intranet 105 from greeting server application 302 to telephone system 100. In response to the received request, telephone system 100 initiates a call from telephone 102 to the identified alternate destination. For calls transported by Internet/intranet 105, the possible alternate destinations include alternate terminals for the called party that are equipped with an IP telephony application, such as terminal 110. Such calls may be implemented using conventional IP telephony protocols. In response to the calling party selection, greeting server application 302 sends the IP address of the selected alternate destination to client greeting application 203 on the calling party's terminal 106 via Internet/intranet 105. In response to the received IP address, client greeting application 203 initiates an IP telephony call using the received IP address and IP telephony application 202.

At step 502, the calling party at terminal 106 chooses to initiate a call to a party other than the called party, such as an operator, superior, or secretary of the called party. The other party may be selected from a list presented with the greeting information displayed by web browser application 201. As in step 501, for calls transported by telephone system 100, the other destinations may include another destination on the same phone system such as telephone 101 or destinations in the PSTN, and the call can be implemented using conventional CTI capabilities of telephone system 100. For calls transported by Internet/intranet 105, the other destinations may include other terminals that are equipped with an IP telephony application, such as terminal 107, and the call can be implemented using conventional IP telephony protocols.

At step 503, the calling party chooses to page the called party. This action is chosen after the information to be sent to a called party pager is entered in step 500. The information may be numeric, such a telephone number for the called party to call, or alphanumeric, such a text message. The called party is then paged with the entered information via conventional techniques. For example, in response to the calling party selection, greeting server application 302 formulates an electronic mail message identifying the called party and the information to send to the called party pager. This electronic mail message may be sent to the electronic mail system of the service provider of the called party's paging service. In response to the receipt of the electronic mail message, the service provider sends a page to the called party which contains the information collected from the calling party. As another example, in response to the calling party selection, greeting server application 302 interacts with telephony hardware such as a Dialogic Tip/Ring interface card to place a call via the PSTN to the service provider of the called party's paging service. A conventional dial-up paging system call may be used to request a page to the called party with the information collected from the calling party. In response to the received request, the service provider sends a page to the called party which contains the information collected from the calling party.

At step 504, the calling party chooses any other action and/or views any other data the called party wishes to present on their greeting web page. This includes but is not limited to retrieving documents the called party wishes to make available, viewing the called party's calendar, viewing other data associated with the called party such as company title, electronic mail address, favorite URLs, personal photograph, etc., leaving a message for the called party, launching a terminal-based chat session with the called party, and viewing information that is intended only for the specific calling party.

Of course, various changes and modifications to the illustrative embodiment described above will be apparent to those skilled in the art. For example, multiple application servers may be employed to implement the Internet/intranet greeting service. The HTTP server application 301, the greeting server application 302, and the directory server application 304 of the application server 109 may each be implemented on different host computers. Furthermore, the functions of the various individual applications 301, 302 and 304 of application server 109 could be combined into a single server. Similarly, the applications 201, 202 and 203 of a given user terminal could be implemented in a single server application program.

Another possible modification involves the elimination of the directory server application 304. Requests for greeting data from the calling party web browser 201 to the HTTP server 301 could instead take a from similar to "http://<server address>/<telephone number>" or "http://<server address>/<IP address>" where <server address> is preconfigured in all user terminals and <telephone number> or <IP address> is provided by the client greeting application after the call is initialized. The <telephone number> or <IP address> is passed by the HTTP server 301 to the greeting server application 302. The greeting server application 302 can then resolve the <telephone number> or <IP address> to the corresponding greeting data without the need for a directory server such as server 304.

Other possible modifications involve changes to the physical connectivity of the user terminals to the telephone system so as to equip the user terminals with CTI features such as call placement and receipt of call progress information. In particular, two alternate forms of CTI connectivity could be supported. One is known as LAN-Proxy CTI and the other is known as Direct-Connect CTI. An illustrative implementation of the invention for each of these alternate types of connectivity is given below. In the case of LAN-Proxy CTI, a server equipped with the physical hardware required to terminate an interface that the telephone system natively supports, such as a Basic Rate Interface (BRI), is set up. The server is equipped with a connection to the Internet/intranet, and with any additional hardware or software that is required to convert messages from the telephone system native interface to messages that can be transported by the Internet/intranet. This server acts as a proxy between the telephone system and user terminals for CTI features. CTI messages are delivered to and from user terminals over the Internet/intranet and to and from the telephone system over its native interface. In the case of Direct-Connect CTI, the user terminals are equipped with the hardware and software needed to directly connect to a telephone adapter. The telephone adapter may be integrated into a user's telephone or exist as an adjunct to the telephone and provides access to CTI messages sent to and from the telephone system. In this case, CTI messages are delivered to and from the user terminal via the terminal adapter without the use of the Internet/intranet. These and other alternative embodiments of the invention within the scope of the following claims will be apparent to those of ordinary skill in the art.

What is claimed is:

1. A method of providing information to a caller in response to a call placed to a called party, the method comprising the steps of:
   automatically determining, in response to placement of the call, an identifier of greeting data associated with the called party, the call being placed to the called party for the purpose of establishing live voice communication with the called party;
   retrieving the greeting data for the called party over a network connection;
   displaying a greeting web page including the greeting data to the caller during the call; and
   permitting the caller to select an alternate destination for the call and, in response to a caller selection on the displayed web page, automatically redirect the call using the selected alternate destination.

2. The method of claim 1 wherein the step of automatically determining an identifier includes requesting a greeting URL for the called party from a directory server, using at least one of a telephone number, an e-mail address, a called party name, a domain name, number identifying information, and an Internet Protocol (IP) address of the called party.

3. The method of claim 1 wherein the call is a telephone call.

4. The method of claim 1 wherein the call is an Internet Protocol (IP) call.

5. The method of claim 1 further including the step of permitting the caller to select a covering party for the call based on information in the displayed web page.

6. A method of providing information to a caller in response to a call placed to a called party, the method comprising the steps of:
   automatically determining, in response to placement of the call, an identifier of greeting data associated with the called party, the call being placed to the called party for the purpose of establishing live voice communication with the called party;
   retrieving the greeting data for the called party over a network connection;
   displaying a greeting web page including the greeting data to the caller during the call; and
   permitting the caller to page the called party in response to a caller selection on the displayed web page.

7. The method of claim 1 further including the step of permitting the caller to leave a message for the called party using the displayed web page.

8. The method of claim 1 further including the step of permitting the caller to conduct a textual chat with the called party via the displayed web page.

9. The method of claim 1 wherein the displayed web page is periodically updated during the call to provide information regarding call progress.

10. As The method of claim 1 further including the step of permitting the called party to send a message to the caller via the displayed web page.

11. The method of claim 1 wherein the displayed web page includes private information intended only for the caller.

12. The method of claim 1 further including the step of permitting the caller to retrieve documents from the displayed web page.

13. An apparatus for providing information to a caller in response to a call placed to a called party, the apparatus comprising:

a database for storing greeting data associated with the called pa the greeting data being automatically determined in response to placement of the call; and at least one server for generating a greeting web page including the greeting data associated with the called party, wherein the greeting data is retrieved in response to placement of the call, and the greeting web page is displayed to the caller during the call, the displayed web page permitting the caller to select, based on information in the displayed web page, at least one of: (i) an alternate destination for the call; and (ii) a covering party for the call; wherein the selecting of an alternate destination for the call and the selecting of a covering party for the call are initiated in response to a caller selection on the displayed web page;

wherein the call is placed to the called party for the purpose of establishing live voice communication with the called party.

14. The apparatus of claim 13 wherein the call is a telephone call.

15. The apparatus of claim 13 wherein the call is an Internet Protocol (IP) call.

16. The apparatus of claim 13, wherein the at least one server is further operative to periodically update the displayed web page with additional information regarding the call or the called party.

17. The apparatus of claim 13 wherein the displayed web page provides at least one of the following capabilities: (i) permits the caller to page the called party based on information in the displayed web page; (ii) permits the caller to leave a message for the called party using the displayed web page; (iii) permits the caller to conduct a textual chat with the called party via the displayed web page; (iv) provides the caller with information regarding call progress; (v) permits the called party to send a message to the caller via the displayed web page; (vi) displays private information intended only for the caller; and (vii) permits the caller to retrieve documents from the displayed web page.

18. A computer-readable medium containing software which, when executed in a computer, causes the computer to perform the steps of:

automatically determining, in response to placement of a call to a called party, an identifier of greeting data associated with the called party, the call being placed for the purpose of establishing live voice communication with the called party;

retrieving the greeting data for the called party over a network connection;

displaying a greeting web page including the greeting data to the caller during the call; and permitting the caller to select an alternate destination for the call and, in response a caller selection on the displayed web page, automatically redirect the call placed to the called party using the selected alternate destination.

19. An apparatus for providing information to a caller in response to a call placed to a called party, the apparatus comprising:

a computer operative to implement a web browser application program and a greeting application program, wherein the web browser application program automatically retrieves greeting data associated with the called party in response to information requested by the greeting application program upon initiation of the call, such that the retrieved greeting data is displayed to the caller during the call in the form of a greeting web page, the displayed web page permitting the caller to select, based on information in the displayed web page, at least one of: (i) an alternate destination for the call; (ii) a covering party for the call; and (iii) paging the called party, wherein the section of an alternate destination for the call, a covering party for the call and paging the called party are initiated in response to a caller selection on the displayed web page;

wherein the call is placed to the called party for the purpose of establishing live voice communication with the called party.

20. An apparatus for providing information to a caller in response to a call placed to a called party, the apparatus comprising:

a computer operative to implement a web browser application program and greeting application program, wherein the web browser application program automatically retrieves a greeting web page associated with the called party in response to information requested by the greeting application program upon initiation of the call, such that the retrieved greeting web page is displayed to the caller during the call, the displayed web page permitting the caller to select, based on information in the displayed web page, at least one of: (i) an alternate destination for the call; (ii) a covering party for the call; and (iii) paging the called party, wherein the selection of an alternate destination for the call, a covering party for the call and paging the called party are initiated in response to a caller selection on the displayed web page;

wherein the call is placed to the called party for the purpose of establishing live voice communication with the called party.

* * * * *

UNITED STATES PATENT AND TRADEMARK OFFICE
CERTIFICATE OF CORRECTION

PATENT NO.    : 6,480,484 B2
DATED         : November 12, 2002
INVENTOR(S)   : Michael D. Morton It is certified that error appears in the above-identified patent and that said Letters Patent is hereby corrected as shown below:

<u>Column 8,</u>
Line 65, "As The" should be -- The --.

<u>Column 9,</u>
Line 11, "pa" should be -- party, an identifier of --.

Signed and Sealed this

Twentieth Day of January, 2004

JON W. DUDAS
*Acting Director of the United States Patent and Trademark Office*